United States Patent [19]

Farley et al.

[11] Patent Number: 4,663,225

[45] Date of Patent: May 5, 1987

[54] FIBER REINFORCED COMPOSITES AND METHOD FOR THEIR MANUFACTURE

[75] Inventors: Radcliffe W. Farley, Worcester, Pa.; Edward A. Vaughn, Clemson, S.C.; Clarke A. Rodman, East Providence, R.I.; Edward C. Homonoff, Brooklyn, Conn.

[73] Assignee: Allied Corporation, Morristown, N.J.

[21] Appl. No.: 858,974

[22] Filed: May 2, 1986

[51] Int. Cl.⁴ .................. B32B 1/00; B29C 45/14; D04H 1/58
[52] U.S. Cl. .................. 428/290; 156/221; 156/228; 156/245; 264/119; 264/122; 264/126; 264/257; 264/328.1; 428/35; 428/174; 428/296
[58] Field of Search .................. 156/221, 228, 245; 264/119, 122, 126, 257, 328.1; 428/35, 174, 290, 296

[56] References Cited

U.S. PATENT DOCUMENTS

| | | |
|---|---|---|
| 2,847,712 | 8/1958 | Pollard et al. |
| 3,850,723 | 11/1974 | Ackley |
| 4,195,112 | 3/1980 | Sheard et al. ............ 428/288 |
| 4,258,093 | 3/1981 | Benedyk ................. 428/284 |
| 4,287,143 | 9/1981 | Sears, Jr. et al. |
| 4,298,643 | 11/1981 | Miyagawa et al. ........ 428/253 |
| 4,356,228 | 10/1982 | Kobayashi et al. ....... 428/290 |
| 4,359,132 | 11/1982 | Parker et al. ........... 428/288 |
| 4,373,001 | 2/1983 | Smith et al. ............. 428/246 |
| 4,418,031 | 11/1983 | Doerer et al. |
| 4,474,846 | 10/1984 | Doerer et al. ............ 428/280 |

OTHER PUBLICATIONS

Shell Technical Brochure.
U.S. patent application No. 858,785, filed May 2, 1986, Rodman et al.

Primary Examiner—James C. Cannon
Attorney, Agent, or Firm—Ken C. Decker; William N. Antonis

[57] ABSTRACT

A fiber reinforced, composite article is manufactured by forming a nonwoven, air-laid batt from a single fiber type or a mixture of fibers. The batt is either resinated with a thermoplastic material or includes a thermoplastic binder fiber. The batt is formed into a preform having the desired shape in a through-air mold and heated sufficiently to set the thermoplastic material, so that the resulting preform retains the desired shape and is sufficiently stiff to withstand the pressure of the injected resin. The preform is then transferred to a resin injection mold, where the interstices between the fibers are saturated with an appropriate resin matrix. As the fibers of the preform are saturated (or after a saturation but before the resin sets) the resin transfer mold is compressed, thereby forming the preform into its final desired thickness and increasing the concentration of the fibers to give the preform appropriate strength. Accordingly, the preform retains the open characteristics permitting easy injection of the resin, while later being compressed to increase the concentration of the reinforcing fibers to give the resulting composite the appropriate strength.

28 Claims, 5 Drawing Figures

FIBER REINFORCED COMPOSITES AND METHOD FOR THEIR MANUFACTURE

This invention relates to fiber reinforced structural composites and a method for their manufacture.

Structural members which must bear heavy load, such as those used in automobile bodies or frames, machinery, building construction, etc., commonly must be formed into fairly complex shapes. Accordingly, such structural members are relatively heavy and the machinery and tooling necessary to form these members is necessarily complex and expensive. It has long been recognized that making such structural materials out of composite materials, such as a composite fiberglass and resin matrix, could result in a structural member having a much lower weight, and could be formed with less expensive machinery, dies, etc. Accordingly, structured components are potentially less expensive than structural members made out of steel. However, such structural composites have proven to be extremely labor intensive. This is because the most practical method of manufacturing such structural composites has been to form the skeletal fiber into a felt or woven cloth, impregnate the cloth or felt with resin and then hand laying up the impregnated cloth onto a support or form.

Not only is this process extremely labor intensive because of the hand layups, but also the potential strength of such composites has not been realized. This is because the woven or felted cloths, while they are extremely strong in the two lateral dimensions, inherently have no reinforcing fibers extending in the depth dimension when these cloths or felts are hand laid. While these structural composites are relatively strong in two dimensions, they are relatively weak in the third dimension. Accordingly, structural members, such as automobile bodies, made from structural composites instead of steel have been the exception rather than the rule.

The present invention provides a structural composite (and method by which it may be manufactured) which has substantially the same strength in all three spatial dimensions, and which can be manufactured in a continously contoured complex shape capable of supporting loads under varying flexural conditions. The method permits manufacture of such structural composites using labor-saving, high-speed automated techniques. According to the invention, a web or batt of randomly disposed, air-laid fibers is manufactured with a substantial portion of the fibers extending through the depth of the batt so that fibers interengage each other in all three spatial dimensions. Some of the fibers are thermoplastic fibers, or a thermoplastic material can be applied to the batt after the batt is manufactured. The batt may then heated to a relatively low temperature (if necessary) sufficient to stabilize the thermoplastic material in the batt to permit handling of the batt without it breaking apart. The batt is then transferred to a through-air mold having a supporting screen shaped in the shape of the desired structural article. Heated air is then drawn through the batt and the screen sufficient to force the batt against the screen while heating the batt to a temperature sufficient to fuse the batt into the desired shape without substantially compressing the fibers in the batt. The preform thus manufactured in the through-air mold retains its open characteristics while being fused into a handleable object. The preform is then transferred to a varible compression, resin transfer mold. Because the batt was not substantially compressed when it was formed into the preformed shape, the resin matrix fills the interstices between the fibers and readily saturates the preform. As the preform is being saturated by the resin matrix, the preform is compressed into the desired thickness, thus forming the final article and compressing the fibers in the batt to increase their concentration and therefore increase the strength of the structural article formed thereby. By retaining the open structure of the uncompressed preform until it is saturated with resin, the preform readily accepts the resin. However, since the preform has been heated to a temperature sufficient to fuse the thermoplastic materials, the fibers in the preform are able to withstand the compressive forces caused by injection of the resin matrix. It is, however, desirable to choose a resin matrix which either has a relatively low viscosity or which attains a relatively low viscosity upon being heated to a temperature less than the melting point of the thermoplastic fibers or material used in the preform.

Another advantage inherent in the invention is that the desired article may take on the desirable characteristics of each component of a mixture of fibers. For example, because fiberglass is relatively inelastic, it has become customary to make structural composites out of fiberglass. However, fiberglass has a relatively low impact strength, so that articles made out of fiberglass composites shatter relatively easily. By manufacturing the aforementioned batt out of a mixture of fiberglass and another fiber which is relatively elastic but has a higher impact strength than fiberglass, an article may be made that is relatively inelastic but also has a high impact strength.

These and other features of the invention will become apparent from the following description, with reference to the accompanying drawings, in which.

Figure 1:
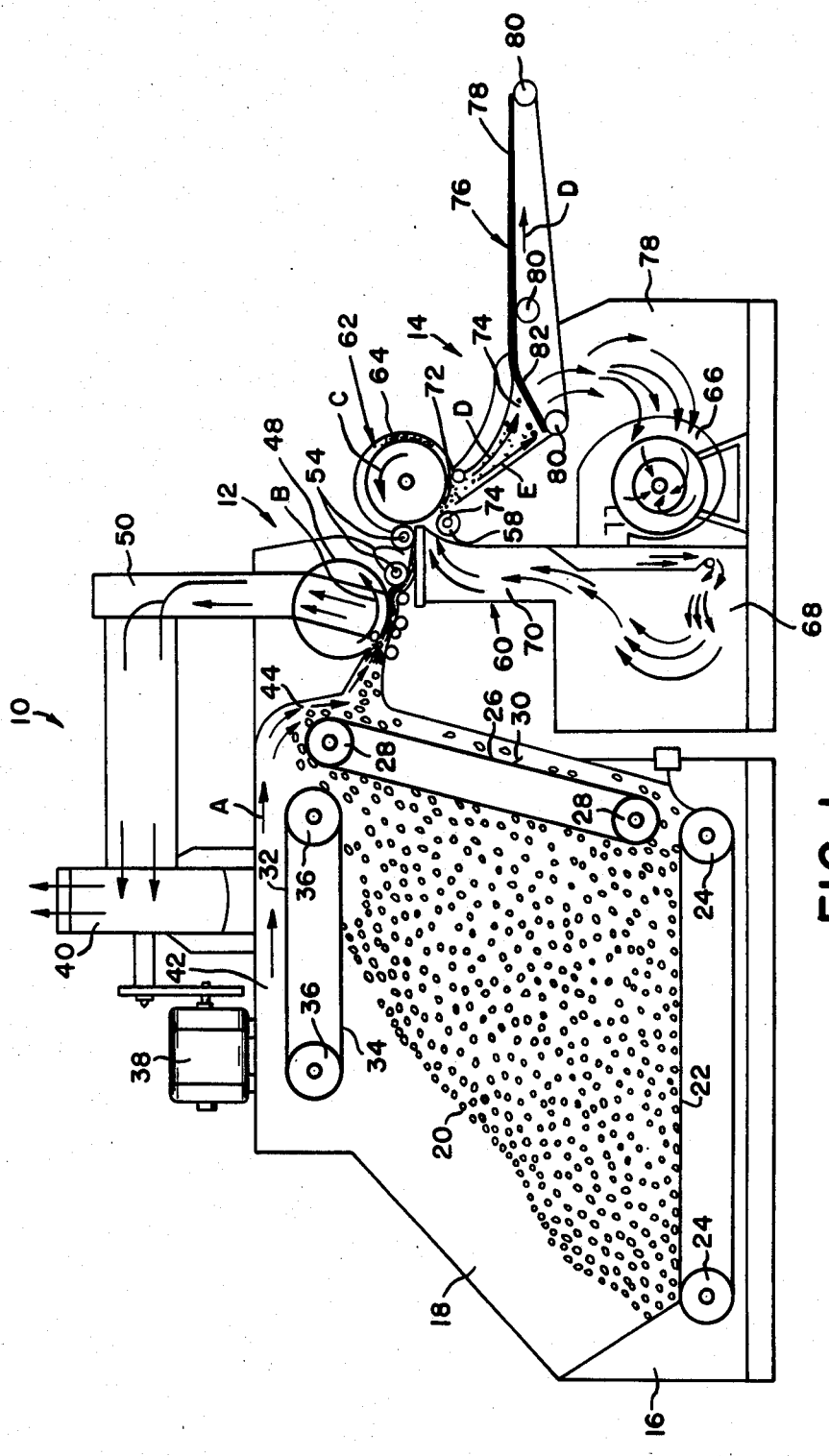
FIG. 1 is a cross-sectional view schematically illustrating an air laid nonwoven batt formation machine.
Figure 2:
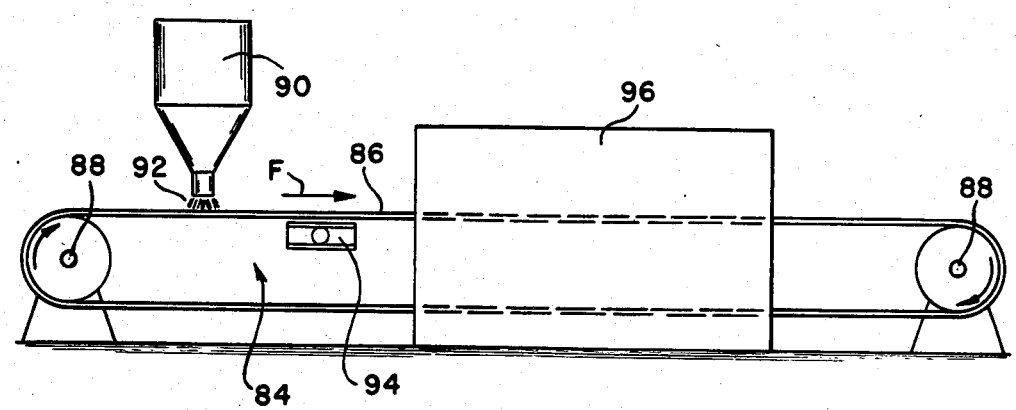
FIG. 2 is a view of the conveyer line which treats the batt formed by the machine illustrated in FIG. 1 as it is removed from the machine.

Referring now to the FIG. 1 of the drawing, an air-laid, nonwoven, batt-formation machine is generally indicared by the numeral 10 and is of the type generally illustrated in U.S. Pat. No. 3,918,126. The machine 10 is comprised of a feeding mechanism generally indicated by the numeral 12 and a web-formation mechanism generally indicated by the numeral 14.

Feeding mechanism 12 includes a housing 16 which encloses a relatively large hopper 18 which receives the fiber from which the web or batt is to be manufactured. Of course, the fibers are first opened and blended in the conventional manner before being placed in the hopper 18. The fiber mixture includes staple structural fibers such as curled or uncurled fiberglass, graxhite fibers and/or high strength polyester. Also, thermoplastic fibers are included if the batt is not to be resinated with a thermoplastic material. In the preferred embodiment, the fibers in the hopper 18 are comprised of 52.5% curled fiberglass, available commercially from Owens-Corning Fiberglass Corporation; 17.5% Compet ® polyester fiber, available commercially from Allied Corporation; and 30% of a thermoplastic, binder fiber know such a Vinyon ®, available commercially from Celeanese Corporation; or polyester fibers such as Dacron ®, available commercially from DuPont Corporation; or Kodel ®, available commercially from Eastman Kodak Company. The blended fibers are indicated by the reference numeral 20. A conveying apron 22 is mounted on rollers 24 located within the hopper 18 which are turned in the direction of the arrows by an appropriate power source (not shown), to move the fibers 20 to the right viewing FIG. 1 toward an elevating apron generally indicated by the numeral 26. The elevating apron 26 is mounted on rollers 28 located within the hopper and is provided with elongated spikes 30 extending therefrom. The rollers are operated by a power source such that the fibers are moved upwardly, viewing FIG. 1. A stripper apron 32 is provided with spikes 34 and is wrapped about rollers 36 which are also operated by a power source. A power source 38 operates a fan 40 which draws air through channel 42 defined between the stripper apron 32 and the upper wall of the housing 16, generally in the direction of the Arrow A. The metered airflow through the channel 42 removes a predetermined quantity of the fibers 20 from the elevating apron 26. The remaining fibers are returned to the hopper through channel 46, defined between the elevator apron 26 and the corresponding wall of the housing 16. The metered airflow indicated by Arrow A forces the fibers into a duct 44 defined between the upper edge of the elevating apron 26 and the corresponding wall of the housing 16.

The fibers are then consolidated into a feed mat 47 by the air flowing through the channel 42 and the duct 44. This air flow enters a cylinderical, porous condenser screen 48 which is rotated in the direction of the Arrow B by an appropriate power source (not shown). The air flow is ducted back to the blower 40 by ductwork generally indicated by the numeral 50. The rotating screen 48 compresses the feed mat 47 by cooperating with feed rollers 52, which cooperate with mechanical rolls 54 to advance the feed mat toward the mat formation mechanism, generally indicated by the numeral 14. The fibers are then brushed off nosebar 58 which is carried on housing 60 forming a part of the web formation mechanism 14 by a rotating lickerin generally indicated by the numeral 62. The lickerin 62 is provided with a serrated surface defining spikes or teeth 64 across the entire width and around the circumference of lickerin 62. The lickerin 62 is powered for rotation as indicated by the Arrow C.

The fibers are doffed from licerin 62 by centrifical forces generated by the rotating speed of the lickerin 62 and also by air flow provided by a blower 66. Blower 66 blows air into a chamber 68 defined within the housing 60 which is guided through a duct 70 and into a channel 72 defined between a saber 74 and the lickering 62. The blended fibers are removed from the lickering and are conveyed by the air stream through a duct 75 to a foraminous conveyer, generally indicated by the numeral 76. The inlet of the blower 66 is connected to a chamber 77 defined within the housing 60 which in turn in communicated to the duct 75 through the foraminous conveyer 76. The foraminous conveyer 76 includes a foraminous belt 78 mounted on rollers 80 which move the belt in the direction indicated by the Arrow D. Since the belt 78 is porous and permits air flow therethrough, the blower 66 is capable of circulating air through the channel 72, the duct 74, the chambers 77 and 68, and the duct 70. Accordingly, the fibers are doffed from the lickerin 62 and blown through the duct 74 and are condensed on a portion 82 of the foraminous belt 78 to form a nonwoven mat. Since the foraminous belt 78 is rotated around the rollers 80 the mat eventually exits from the portion of the belt covered by the duct 74.

The rotating speed of the lickerin 62 and the quantity of air pumped by the blower 66 may be adjusted in a conventional manner to adjust the weight of the batt formed by the web formation machine 10. Although lighter weight batts are acceptable, the invention perfers that relatively heavy batts, of a weight, for example, of four ounces/square yard or greater, are preferred because batts of this weight provide a sufficient quantity of fiber reinforcement for the structural composite to be manufactured as hereinafter described. It is also important that the fibers comprising the batt, which are randomly arrayed due to being blown through the duct 74, be sufficiently long that they cross each other a number of times, thereby providing relative attraction forces between the fibers so that each fiber can hold other fibers in place. It is preferred that fibers of at least one inch in length be used, since tests have shown that fibers of this length engage other fibers in the batt an average of three times, thus providing the number of engagements with other fibers necessary to form a satisfactory batt. Fibers of shorter length may be used, but they would, of course, engage other fibers, on average, fewer times, thus providing a batt with less intergrity.

As discussed above, an important feature of the invention is that structural composites formed from the batts produced have strength in all three spatial dimensions. The strengh is provided by the reinforcement provided by the fibers used to make the composite. Accordingly, the nonwoven batt formed by the machine 10 will have randomly arrayed fibers which extend in all three spatial dimensions, since the random orientation of the fibers is a necessary consequence of the air formation process. However, it has been shown that the percentage of fibers arranged in the direction of the depth of the batt varies considerably, depending upon the direction of air flow through the duct 74. This direction is controlled by the spacing between the saber 74 and the lickerin 62. The saber 74 is mounted on an eccentric, so that its position relative to the lickerin, 62 is adjustable, thereby making the width of the channel 72 also adjustable. Normally, the saber 74 is spaced away from the lickerin 62 so that the air flow through the channel 72 tends to follow the shape of the channel in the direction of the Arrow D. While batts formed with air flow in this direction will have some fibers having components oriented in the direction of the depth of the batt, the majority of fibers will be oriented along the length and the width of the batt. However, it has been discovered that by moving the saber, 74 closer to the lickering 62 and by adjusting the blower 66 accordingly, a venturi effect is created which deflects the air flow in the direction of the Arrow E. Batts formed in this manner have been found to have about 30% of their fibers having components oriented in the direction of the depth of the batt. Accordingly, a composite material formed from a batt having 30% of the fibers oriented in the depth direction will have almost the same strenth in all three spatial dimensions.

The machine 10 has been described in accordance with the feeding mechanism 12. However, the purpose of the feeding mechanism 12 is to produce the feed mat 46 for the web formation mechanism 14. As is well know to those skilled in the art, the feed web may also be formed from a roller card and cross-lapping machine. This latter mechanism may be more efficient for a high volume production. Alternatively, the feed web may also be formed by a picker. This system may be more efficient for producing diversified, short-run lots.

The batt is transferred from the conveyor 78 onto an adjacent conveyer 84 which includes a formainous belt 86 powered for rotation about rollers 88 in the direction indicated by the Arrow F. If the batt is to be resinated in lieu of using binder fibers or in addition to using binder fibers, an appropriate foamed resin is poured into the hopper 90 and is dispensed onto the batt traveling on the belt or conveyer 86 through nozzles 92. Since the belt 86 is foraminous, the foam can be pulled through the batt to saturate the same by applying a vacuum on the underside of the batt through the vacuum puller 94. The excess foam is pulled into the vacuum puller 94 and is recirculated into the hopper 90. The batt is then carried on the belt 86 through an oven 96 which is heated to a temperature just over 200° F., which heats the batt sufficiently to stablize the batt and to permit its handling. The batt therefore is heated to a temperature to soften, but not melt, the themoplastic binder fibers or the resin applied to the batt, both of which have a melting temperature of about 250° F. As discussed above, the purpose of the oven 96 is to stabilize the batt to permit handling without breaking it apart. If, because of the fibers used, the batt does not easily pull apart as formed, the oven 96 may be eliminated.

As discussed hereinabove, an important feature of the invention is the fact that the batt is molded into a preform shape of the composite article before being impregnated with the appropriate resin. It is found that if the batt is molded while it is being impregnated, it is extremely difficult to assure complete saturation of the batt, particularly if the shape of the composite article to be formed is complex. Furthermore, the batt is also heated as it is molded into the preform, thus curing the batt and causing the thermoplastic binder fibers to at least partially melt and thereby hold the structural fibers in place. Accordingly, when the preform is injected with the resin matrix, the fibers of the preform resist deformation under the action of the resin being injected into them. Accordingly, the fibers remain in their structural skeleton position, thereby insuring a uniform concentration of fibers in the final product, to produce a consistent product of fairly uniform strength.

Figure 3:
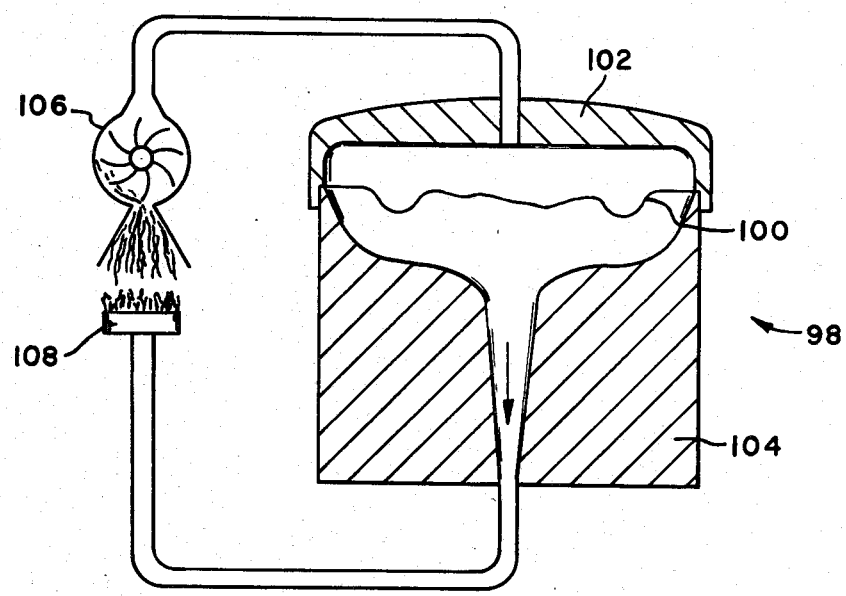
FIG. 3 is a cross-sectional view of a diagrammatic representation of a contour mold used to form the batt made by the machine of FIG. 1 into a preform shape.
Figure 4:
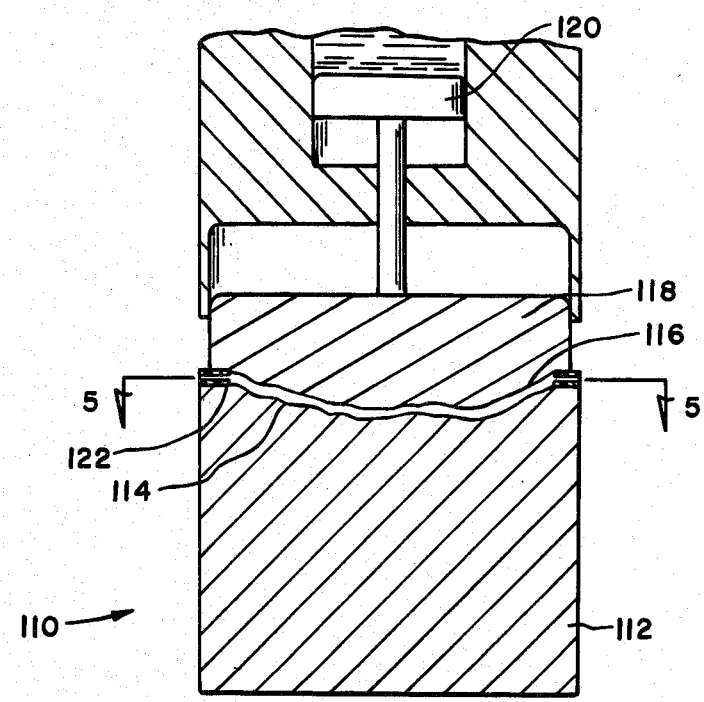
FIG. 4 is a cross-sectional view of a diagrammatic representation of a compression mold.
Figure 5:
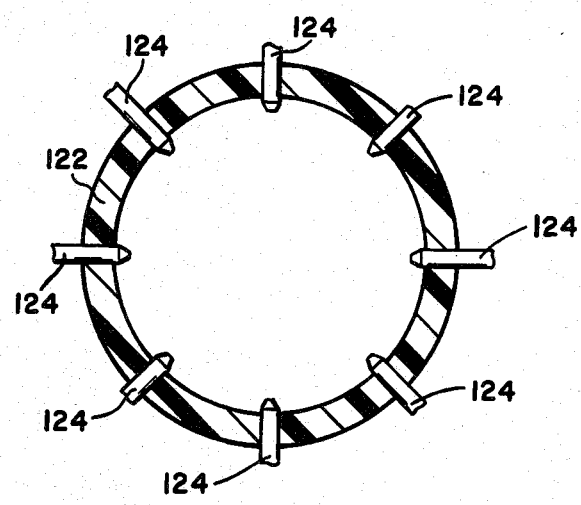
FIG. 5 is a perspective view of an article made by the process illustrated in FIGS. 1–4.

The preform is made in a preform contour mold, generally indicated by the numeral 98 in FIG. 3. The mold 98 is preferably a conventional through-air mold and includes a gas-permeable screen 100 which is contoured in the shape of the preform to be molded. A portion of the batt is placed on the screen 100 and the cover 102 of the mold is closed upon the body 104 thereof and a gas-impermeable seal is effected therebetween. A fan 106 circulates air in the direction of the Arrow X so that the batt is forced to assume the contours of the screen 100 by virtue of the gas being forced therethrough. Although air would normally be used, it is possible in certain applications that a gas other than air may be necessary. The gas being circulated through the mold is heated by a burner 108 to a termperature sufficient to melt the thermoplastic binder material (either the binder fibers or the resin applied to the batt), thereby causing the batt to fuse in a shape-retaining contour of the screen 100. In the preferred embodiment, in which Vinyon ® is used as a binder fiber, the air would be heated to about 200° F., or about the sticking point of the binder fiber, that is, the temperature at which the fiber becomes tacky.

Of course, the stiffness of the batt will depend upon the percentage of binder fiber and/or thermoplastic resin used in the batt. A higher concentration of binder fiber will produce a stiffer preform, which can withstand a more viscous resin in the resin injection step. However, a higher concentration of binder fiber necessarily reduces the concentration of the structural fibers, so that the final product formed from a batt having a higher concentration of binder material will have inherently less strength than a batt formed with a lower concentration of binder material and a corresponding higher concentration of structural fibers. Furthermore, a higher concentration of binder material may cause excess undersirable shrinkage of the batt. It is also desirable that the batt not be excessively compressed as it is formed into the preform sheet. Accordingly, the open structure of the batt is retained, thereby facilitating saturation of the fibers by the resin matrix in the resin injection step. Although molds other than the through-air mold shown in FIG. 3, such as a conventional press type mold, may be used, care must be taken that the batt not excessively compressed, although some compression is unavoidable in forcing the batt to assume the complex contours of the mold.

The preform is then removed from the contour preform mold 98 and transferred to a conventional variable compression resin injection mold generally indicated by the numeral 110. Resin transfer mold 110 includes a base portion 112 which has a contoured shaped portion 114 which is the shape of the final composite article to be formed. The shape 114 is adapted to cooperate with a correspondingly shaped portion 116 of a cover member 118 which can be forced toward the portion 114 with a predetermined compressive force by a hydraulic actuator, indicated diagrammatically at 120. A parametrically extending gasket 122 is located at the periphery of the interface between the mold portions 112 and 118 and is provided with a circumferencely spaced resin injection jets 124. One of the jets 126 is selected as a drain port. The preform is placed on the mold portion 114 and the cover portion 118 is closed against the gasket 122. Preferably, the gap between the mold surfaces 114 and 116 is sufficiently great that the preform can be placed in the mold and the cover member 118 closed against gasket 122 without appreciably compressing the preform. An appropriate resin is then injected through jets 124 until the interstices between the fibers of the preforms are completely sáturated with the resin and some of the resin begins draining out of the drain port 126. Although any of a number of resins are satisfactory, for example, Epon ® 828 resin available commercially from Shell Chemical Company may be used. As discussed above, it is preferred that the resin has a relatively low viscosity so that the batt need not be overly stiffened to prevent deformation under the action of the injection of the resin matrix. Accordingly, the resin is chosen has an inherently low viscosity at room temperatures, or the resin such as the aforementioned Epon ® 828 resin system can be heated to a temperature in which it has a sufficiently low viscosity. If necessary, the mold portions 118 and 112 can be heated to assist in curing the resin. As the preform becomes saturated with the resin (or after the preform has been satured but before the resin is cured), the cover 118 is forced against the preform by action of the hydraulic actuator 120, thereby compressing the preform as it becomes saturated or immediately after it becomes saturated, thereby increasing the concentration of the structural reinforcing fibers to thereby increase the strength of the final product. Accordingly, the preform is initial of a relatively open structure, to permit easy saturation by the resin, but after the preform becomes saturated, the concentration of the fibers is increased by operation of the variable compression mold 110, to thereby mold the product to its final shape and to increase the concentration of the reinforcing fibers to produce an article that has acceptable strength.

The invention has been described in connection with the use of staple structural fibers for the manufacture of the air-laid nonwoven batt that forms the skeletal material for the fiber reinforced composite article, fibers in forms other than cut staple fibers may be used. For example, continous filiment tow may be used, and may be processed and blended as described in U.S. Pat. No. 4,514,880.

By way of illustration but not by way of limitation, the following examples are given, (all percentages are weight percent):

Example 1

A nonwoven, air-laid batt was prepared, using 52.5% curled glass fiber, 17.5% Compet ® fiber, and 30% of a polyester binder fiber known commerically as Vinyon ®. The batt was molded into a preform as described above. The preform could then be impregnated with the appropriate resin as described above, and would have acceptable strength in all three spatial dimensions, while being relatively inelastic and having a relatively good impact strength.

Example 2

A batt was prepared and treated as described above in Example 1 of the foregoing specification, but the batt was made from a mixture of 35% curled fiberglass, 35% Compet ® fiber, and 30% Vinyon ®. Composite materials made from this fiber would have somewhat greater impact strength than the composite materials prepared as in Example 1 because of the higher percentage of the Compet ® fiber, but would have greater elasticity because of the lower percentage of fiberglass.

Example 3

A nonwoven, air-laid batt was prepared above as in Examples 1 and 2, but consisted of a mixture of 70% curled fiberglass and 30% Vinyon ® binder fiber. If the mat were impregnated with a resin as described above, the resulting composite would be relatively inelastic, and would compare to fiberglass structures already on the market. However, because of the absence of fibers having high impact strength, the impact strength of the resulting composite would be relatively low.

Example 4

A nonwoven batt was prepared as discussed above in Examples 1-3, but instead consisted of a mixture of 50% curled fiberglass and 50% of the Vinyon ® binder fiber. Because of the greater percentage of binder fiber, the resultant preform would shrink more than the preforms having the lower percentage of binder fibers, but the properties would otherwise be the same as in Example 3.

Example 5

A batt was prepared as described above in Examples 1-4, but instead of using fiberglass and Compet ® fiber, a fiber sold commercially under the trademark Kevlar ® was used. The resulting batt and any preform or composite article which could be made therefrom would have the characteristics of the impact strength and elastic characteritics of the Kevlar ® rather than of the fiberglass and/or Compet ® fibers.

Example 6

A batt was prepared pursuant to any of these Examples 1-5, but instead of using the Vinyon ® binder fiber, the batt was made without using any binder and instead was resinated with polyvinyl acetate. Any batt made in this way would have similiar characteristics to a batt containing corresponding percentages of fiberglass, Compet ® and/or Kevlar ® as discussed above in Examples 1-5.

Though a number of specific embodiments and examples have been discussed in the foregoing specification, the invention is not limited to these examples and embodiments, but is instead limited only by the scope of the following claims.

We claim:

1. Method of manufacturing fiber reinforced composites comprising the steps of forming a nonwoven batt from structural fibers and a thermoplastic binder material, orienting the fibers as the batt is formed so that a substantial portion of the fibers interlock randomly with other fibers in the mat in each of the three spatial dimensions, molding the batt while heating the batt to a termperature to at least partially melt the binder material to form the batt into a shape-retaining preform of the desired configuration and injecting the preform with a resin matrix to fill the interstices between the fibers.

2. Method of manufacturing fibers reinforced composites as claimed in claim 1, wherein said batt is formed with both said structural fibers and with a thermoplastic binder fiber, said thermoplastic binder fiber being said thermoplastic material added to the batt.

3. Method of manufacturing fiber reinforced composites as claimed in claim 1, wherein the thermoplastic binder material is a thermoplastic compound applied to the batt after the batt is laid.

4. Method of manufacturing fiber reinforced composites as claimed in claim 1, including the step of heating the batt to a lower temperature sufficient to stabilize the batt and permit handling of the batt without tearing the batt apart and then heating the batt to a higher temperature sufficient to at least partially melt the binder material as the batt is formed into said shape-retaining preform.

5. Method of manufacturing fiber reinforced composites as claimed in claim 1, wherein the steps of forming the batt into a shape-retaining preform is effected without substantially compressing the batt.

6. Method of manufacturing fiber reinforced composites as claimed in claim 5, wherein the batt is formed into the shape retaining preform by placing the batt on a gas-permeable member having a desired shape and then drawing gas through the preform and the gas-permeable member to force the batt to assume the contour of the gas-permeable member.

7. Method of manufacturing fiber reinforced composites as claimed in claim 6, wherein the batt is heated as it is formed on said member by heating the gas drawn through the preform.

8. Method of manufacturing fiber reinforced composites as claimed in claim 6, wherein the preform is transferred to a resin injection mold after the preform is molded, the preform being injected with said resin matrix while the preform is disposed in said resin injection mold, said resin injection mold compressing the preform as the fibers of the preform become saturated by said resin matrix to insure the concentration of the structure fibers in the composite and mold the composite into the desired thickness.

9. Method of manufacturing a fiber reinforced composite as claimed in claim 1, wherein the batt is placed in a contour mold to heat the mold sufficiently to at least partially melt the binder material while forming the batt into the shape-retaining preform, and the preform is transferred from the contour mold into a resin injection mold where the preform is injected with the resin matrix.

10. Method of manufacturing fiber reinforced composite as claimed in claim 9, wherein the resin injection mold compresses the preform as the fibers of the preform become saturated by the resin matrix to thereby increase the concentration of the structured fibers in the composite and to mold the composite into the desired thickness.

11. Method of manufacutring a fiber reinforced composite article as claimed in claim 10, wherein said contour mold forms said preform without substantially compressing the batt.

12. Method of manufacturing fiber reinforced composites as claimed in claim 1, wherein said batt is formed by mixing the fibers from which the batt is formed in an air stream, pneumatically conveying said fibers by said air stream to a condenser, and randomly depositing the fibers on the condenser.

13. Method of manufacturing fiber reinforced composites as claimed in claim 12, and further including the step of adjusting the direction of the air stream with respect to the condenser to control the percentage of fibers deposited on the condenser which extend away from the condenser.

14. Method of manufacturing fiber reinforced composites comprising the steps of forming an air-laid nonwoven batt including structural fibers and a thermoplastic binder material, transferring a section of the batt to a preform mold, molding said batt section into a desired preform in the preform mold, transferring the preform to a resin transfer mold, injecting the preform with a resin matrix to fill the interstices between the fibers, and removing the article from the mold after the resin has cured sufficiently to permit handling.

15. Method of manufacturing fiber reinforced composites as claimed in claim 14, wherein said batt section is heated to a temperature sufficient to at least partially melt the binder material while the batt section is disposed in the preform mold.

16. Method of manufacturing fiber reinforced composites as claimed in claim 15, wherein said batt section is molded into said preform without substantial compression of the batt setion.

17. Method of manufacturing fiber reinforced composites as claimed in claim 15, wherein said preform mold includes a gas-permeable member contoured to produce the shape of the preform, said preform being molded by placing the batt section on the gas-permeable member and then drawing gas through the batt section and the gas-permeable member to force the batt section to assume the countour of the gas-permeable member.

18. Method of manufacturing fiber reinforced composites as claimed in claim 17, wherein said batt section is heated by heating the gas drawn through the batt section and the gas-permeable member.

19. Method of manufacturing fiber reinforced composites as claimed in claim 16, wherein said preform is compressed in said resin injection molds the fibers in the preform become saturated with the resin matrix to thereby increase the concentration of the structured fibers in the composite and to mold the composite into the desired thickness.

20. Method of manufacturing fiber reinforced composites as claimed in claim 14, wherein said batt is formed by mixing the fibers from which the batt is formed in an air stream, pneumatically conveying said fibers by said air stream to a condenser, and randomly depositing the fibers on the condenser.

21. Method of manufacturing fiber reinforced composites as claimed in claim 20, further including the step of adjusting the direction of the air stream with respect to the condenser to control the percentages of fibers deposited on the condenser which extend in the direction of the depth of the batt.

22. Fiber reinforced composite acticle comprising a batt of nonwovern structured fibers, said fibers being randomly arranged and interlocked with one another in each of the three spatial dimensions, said batt including a thermoplastic material which has been heated to a temperature sufficient to at least partially melt the thermoplastic material and thus at least partially fuse the staple structural fibers to one another, and a cured resin matrix filling the interstices between the fibers.

23. Fiber reinforced composite article as claimed in claim 22, wherein the batt is a mixture of a first fiber which is relatively inelastic, has relatively low impact strength and a second fiber which has high impact strength.

24. Fiber reinforced composite article as claimed in claim 23, wherein the first fiber is fiberglass.

25. Fiber reinforced composite article as claimed in claim 22, wherein the batt is a mixture of a first fiber which is relatively inelastic but has a relatively low strength, a second fiber which has high impact strength, and a third binder fiber which has a melting point substantially lower than the melting point of the first and second fibers.

26. Fiber reinforced composite article as claimed in claim 22, wherein said batt is a mixture of at least two different types of fibers having different elasticities and impact strength.

27. Fiber reinforced composite article as claimed in claim 22, wherein the article has a greater concentration of fibers than did the batt from which the article was made.

28. Fiber reinforced composite article as claimed in claim 22, wherein said article is molded and has a predetermined concentration of fibers and a predetermined thickness.

* * * * *